US009923706B2

(12) United States Patent
Sharma et al.

(10) Patent No.: US 9,923,706 B2
(45) Date of Patent: Mar. 20, 2018

(54) SYSTEM AND METHOD FOR IN BAND FULL DUPLEX COMMUNICATION IN RADIO NETWORK

(71) Applicants: Centre of Excellence in Wireless Technology, Chennai (IN); Indian Institute of Technology Madras, Chennai (IN)

(72) Inventors: Ankit Sharma, Chennai (IN); Jeniston Deviraj Klutto Milleth, Chennai (IN); Radha Krishna Ganti, Chennai (IN); Sunil Kaimalettu, Chennai (IN); Bhaskar Ramamurthi, Chennai (IN)

(73) Assignees: CENTRE OF EXCELLENCE IN WIRELESS TECHNOLOGY, Chennai, TN (IN); INDIAN INSTITUTE OF TECHNOLOGY, MADRAS, Chennai, TN (IN)

( * ) Notice: Subject to any disclaimer, the term of this patent is extended or adjusted under 35 U.S.C. 154(b) by 77 days.

(21) Appl. No.: 15/211,443

(22) Filed: Jul. 15, 2016

(65) Prior Publication Data

US 2017/0019238 A1    Jan. 19, 2017

(30) Foreign Application Priority Data

Jul. 17, 2015  (IN) ........................... 3692/CHE/2015
Nov. 19, 2015  (IN) ........................... 6243/CHE/2015
Dec. 23, 2015  (IN) ........................... 6877/CHE/2015
Feb. 4, 2016  (IN) ............................. 201641004056

(51) Int. Cl.
*H04L 5/14*  (2006.01)
*H04L 5/00*  (2006.01)
*H04L 1/18*  (2006.01)
*H04B 1/54*  (2006.01)
*H04B 7/06*  (2006.01)

(52) U.S. Cl.
CPC ................. *H04L 5/14* (2013.01); *H04B 1/54* (2013.01); *H04L 1/1812* (2013.01); *H04L 5/0048* (2013.01); *H04L 5/1461* (2013.01); *H04B 7/0617* (2013.01); *H04L 5/0007* (2013.01); *H04L 5/0062* (2013.01)

(58) Field of Classification Search
CPC ....... H04L 5/14; H04L 5/0048; H04L 5/0007; H04L 5/0062; H04L 5/1461; H04L 1/1812; H04B 1/54; H04B 7/0617
See application file for complete search history.

(56) References Cited

U.S. PATENT DOCUMENTS

2016/0381672 A1* 12/2016 Kim ..................... H04W 72/048
                                                             370/329
2017/0201898 A1*  7/2017 Park ........................ H04W 24/08

* cited by examiner

*Primary Examiner* — Jianye Wu

(57) ABSTRACT

The embodiments herein provide a method for In Band Full Duplex (IBFD) communication in a radio network including at least one IBFD node, at least one first non-IBFD User Equipment (UE) and at least one second non-IBFD UE. The method includes transmitting by the at least one IBFD node a first signal to the at least one first non-IBFD UE over a forward channel, and receiving by the at least one IBFD node a second signal from the at least one second non-IBFD UE over the same forward channel simultaneously, where the second signal includes at least one of a pilot signal, Channel State Information (CSI), and control information, where the forward channel is orthogonal to a reverse channel in at least one of time, frequency, space, and code.

55 Claims, 12 Drawing Sheets

SYSTEM AND METHOD FOR IN BAND FULL DUPLEX COMMUNICATION IN RADIO NETWORK

TECHNICAL FIELD

The embodiments herein generally relate to wireless communication systems. More particularly to a system and method for In Band Full Duplex communication in a radio network. The present application is based on, and claims priority from an Indian Application Number 3692/CHE/2015 filed on 17 Jul. 2015, 6243/CHE/2015 filed on 19 Nov. 2015, 6877/CHE/2015 filed on 23 Dec. 2015, and 201641004056 filed on 4 Feb. 2016, the disclosures of which are hereby incorporated by reference.

BACKGROUND

Massive multiple-input and multiple-output (MIMO) and In Band Full Duplex (IBFD) wireless communication are two very prominent techniques being studied under the fifth generation (5G) of wireless technologies. For Massive MIMO systems with large number of antennas at a transmitter, optimal gain is achieved through beamforming by the transmitter towards an appropriate receiver. For instance, the transmitter is a Massive MIMO base station and receivers could be multiple antennas or multiple user equipment spread in a given geographical area. For efficient beam forming, the receiver needs to feedback channel information for large number of antenna links, thus consuming more power and bandwidth.

Typically, the IBFD system transmits and receives data simultaneously using the same channel. In case of the IBFD systems, the power difference between a received signal and self-interference generated by the transmitted signal (up to 130 dB for cellular systems) makes the process of data detection difficult. For Full Duplex (FD) systems, the huge power difference between the received signal and the self-interference generated by the transmitted signal (up to 130 dB for cellular systems), makes the task of data detection difficult. The situation becomes even worse for higher order modulations.

Generally, heterogeneous networks are one of the most preferred ways of increasing network capacities to meet the demands of future networks. A network composed of various layers of cells results in increased spectral efficiency and reduced coverage holes. Cell Range Expansion (CRE) or biasing a user to associate with a smaller tier to offload traffic from macro cells is a well-established technique. Though the capacity of the network as a whole increases, lot of the CRE users experience a bad Downlink (DL) signal-to-interference-plus-noise ratio due to heavy interference from a Macro Base Station (M-BS). For such CRE users, the DL channel from the M-BS is better from their associated small base station (S-BS). For such users, maintaining dual connectivity is optimal i.e., the DL from the M-BS and Uplink (UL) to the S-BS.

Conventionally such CRE users or devices need to duplex between these two connections either in time, frequency, code, and space. With IBFD User Equipment (UE), the need for duplexing between the two connections is obviated. Thus, by using the IBFD UE, the dual connections are maintained on the same channel, simultaneously, thereby resulting in overall increase in the spectral efficiency of the network. There is a tradeoff between form factor and self-interference cancellation (SIC) capability of the device. Further, the IBFD UE with a small form factor has much less SIC capability than the IBFD BS.

High bandwidth demands expected from 5G (5th generation wireless systems) and future wireless networks impose tight constraints on channel resource usage. The resources being available in the form of frequency bands. This has resulted in wireless stations operating on channels becoming increasingly close to each other in frequency. For instance, this separation in state-of-the-art 3GPP Long term evolution (LTE) dynamic time-division duplex (TDD) networks could be as low as 2.5 MHz. This means that a station could be receiving information on a carrier frequency that is only 2.5 MHz apart from the allocated transmit frequency of a neighboring station. The radio-frequency (RF) filters used at the transmitting station cannot practically have brick wall spectrum shaping resulting in spectral leakage out of the allocated spectrum of the transmitter to the adjacent receiver's spectrum.

Hence, due to the limited out-of-band suppression provided by the RF filters, a transmitting station is a potential interference source for neighboring receiver stations operating on adjacent frequencies. This out-of-band interference that is generated by a transmitting station to a close-by (in frequency) receiving station is termed as adjacent channel interference (ACI). Mitigating the adverse effect of the ACI is important for a communication system, as it could potentially saturate the receiver, preventing it from decoding the received signal.

SUMMARY

The principal object of the embodiments herein is to provide a system and method thereof for IBFD communication in a radio network including at least one IBFD node, at least one first non-IBFD User Equipment (UE), and at least one second non-IBFD UE.

Another object of the embodiments herein is to provide at least one IBFD node and method thereof for transmitting a first signal to the at least one first non-IBFD UE over a forward channel, and receiving a second signal from the at least one second non-IBFD UE over the same forward channel simultaneously, where the forward channel is orthogonal to a reverse channel in at least one of time, frequency, space, and code.

Yet another object of the embodiments herein is to provide at least one IBFD node and method thereof for receiving a third signal from at least one third non-IBFD UE over the reverse channel, and transmitting a fourth signal to at least one fourth non-IBFD UE over the reverse channel simultaneously, wherein the fourth signal includes at least one of a pilot signal, CSI, synchronization information, broadcast information, and control channel information.

Yet another object of the embodiments herein is to provide at least one first non-IBFD UE and method thereof for receiving a first signal from the at least one IBFD node over a forward channel.

Yet another object of the embodiments herein is to provide at least one second non-IBFD UE and method thereof for receiving a second signal from the at least one IBFD node over the reverse channel.

Accordingly the embodiments herein provide a method for IBFD communication in a radio network including at least one IBFD node, at least one first non-IBFD UE, and at least one second non-IBFD UE. The method includes transmitting, by the at least one IBFD node, a first signal to the at least one first non-IBFD UE over a forward channel, and receiving by the at least one IBFD node a second signal from the at least one second non-IBFD UE over the same forward channel simultaneously, where the second signal includes at least one of a pilot signal, Channel State Information (CSI), and control information, where the forward channel is orthogonal to a reverse channel in at least one of time, frequency, space, and code.

In an embodiment, the at least one IBFD node determines resources in at least one of time, frequency, space, and code for transmitting the second signal from the at least one second non-IBFD UE.

In an embodiment, the second signal is received in one of a periodic interval and in the resources determined by the at least one IBFD node based on a plurality of parameters.

In an embodiment, one of the periodic interval and the resources are signaled by the at least one IBFD node to the at least one second non-IBFD UE.

In an embodiment, the periodic interval is one of specific and non-specific to the at least one second non-IBFD UE, wherein each of the periodic interval includes a plurality of pilot transmissions by the at least one second non-IBFD UE.

In an embodiment, the plurality of parameters comprises at least one of a channel gain, a channel delay spread, a channel Doppler spread, interference information and location information of at least one of the first non-IBFD UE, the second non-IBFD UE and the at least one IBFD node.

In an embodiment, the at least one IBFD node determines a sequence for the pilot signal for transmitting the second signal from the at least one second non-IBFD UE.

In an embodiment, a resource for the sequence is allocated in one of a contiguous manner and a discontiguous manner in at least one of time and frequency.

In an embodiment, the sequence is one of common and unique for each of the at least one second non-IBFD UE.

In an embodiment, distance between the sequences unique for each of the at least one second non-IBFD UE is maximized.

In an embodiment, the at least one IBFD node performs one of broadcast at least one parameter for the sequence to each of the second non-IBFD UEs when the sequence is common to each of the second non-IBFD UEs, and unicast at least one parameter for the sequence to each of the second non-IBFD UEs when the sequence is unique to each of the second non-IBFD UEs.

In an embodiment, the at least one parameter for the sequence is at least one of a cell identifier, a beam identifier, a UE identifier, and a network identifier.

In an embodiment, a base sequence of the sequence is orthogonal for each neighboring IBFD node.

In an embodiment, the at least one IBFD node determines and signals an optimal power to be used by the at least one second non-IBFD UE for transmitting the second signal based on at least one attribute.

In an embodiment, the attribute comprises at least one of interference information, a location, timing advance and channel quality information.

In an embodiment, the optimal power is spread over at least one of a frequency and time in an Orthogonal Frequency Division Multiplexing (OFDM) symbol.

In an embodiment, the at least one IBFD node receives the second signal on resources of the forward channel, wherein the resources are orthogonally allocated by the at least one IBFD node in at least one of time, frequency, space, and code to the at least one second non-IBFD UE.

In an embodiment, the pilot signal from the at least one second non-IBFD UE is orthogonal to a pilot signal from the IBFD node in at least one time, frequency, space, and code.

In an embodiment, the code is one of a Constant Amplitude Zero Auto-Correlation (CAZAC) sequence, a maximal length m-sequence, and a Gold sequence.

In an embodiment, the method further includes receiving, by the at least one IBFD node, a third signal from at least one third non-IBFD UE over the reverse channel, and transmitting by the at least one IBFD node a fourth signal to at least one fourth non-IBFD UE over the reverse channel simultaneously, wherein the fourth signal comprising at least one of a pilot signal, CSI, synchronization information, broadcast information, and control channel information.

In an embodiment, the control information comprises at least one of a Hybrid Automatic Repeat Request (HARQ) indication, a scheduling grant, modulation and coding index, and power control information.

In an embodiment, the at least one IBFD node calibrates to use reciprocity of the forward channel based on at least one of a known sequence with a low periodicity and the pilot signal.

In an embodiment, the known sequence is transmitted by the second non-IBFD UE.

In an embodiment, the control information comprises at least one of a Hybrid Automatic Repeat Request (HARQ) indication, a scheduling request, a pre-coding matrix indication, a rank indication, interference information and Channel Quality Indicator (CQI).

In an embodiment, at least one of the at least one first non-IBFD UE and the at least one second non-IBFD UE is selected by the at least one IBFD node based on at least one of Interference information, location information, and channel gain.

Accordingly the embodiments herein provide an IBFD node for IBFD communication in a radio network comprising at least one first non-IBFD UE and at least one second non-IBFD UE. The IBFD node includes a memory and a processor, coupled to the memory, configured to transmit a first signal to the at least one first non-IBFD UE over a forward channel, and receive a second signal from the at least one second non-IBFD UE over the same forward channel simultaneously, wherein the second signal comprising at least one of a pilot signal, CSI, and control information, wherein the forward channel is orthogonal to a reverse channel in at least one of time, frequency, space, and code.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1A:
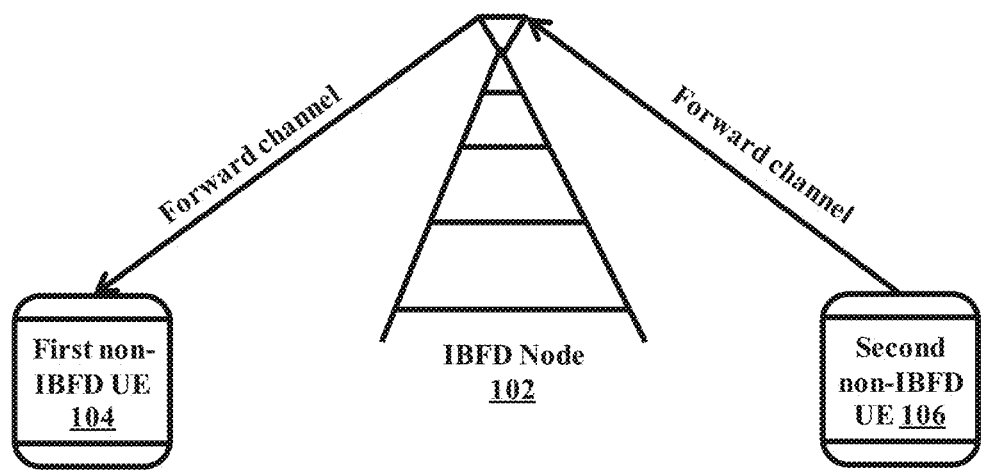
FIG. 1a illustrates a radio network for IBFD communication, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The terms "network", "system", and "network system" are used interchangeably throughout the draft.

Accordingly the embodiments herein provide a method for an IBFD communication in a radio network including at least one IBFD node, at least one first non-IBFD UE, and at least one second non-IBFD UE. The method includes transmitting a first signal to the at least one first non-IBFD UE over a forward channel, and receiving a second signal from the at least one second non-IBFD UE over the same forward channel simultaneously, wherein the second signal includes at least one of a pilot signal, CSI and control information, where the forward channel is orthogonal to a reverse channel in at least one of time, frequency, space, and code.

Referring now to the drawings, and more particularly to FIGS. 1 through 7, where similar reference characters denote corresponding features consistently throughout the figures, there are shown preferred embodiments.

FIG. 1 illustrates a radio network for IBFD communication, according to an embodiment as disclosed herein. In an embodiment, the radio network 100 includes an IBFD node $102_1$ a first non-IBFD UE 104, and a second non-IBFD UE 106. For the sake of brevity and for easy understanding, only one IBFD node in communication with the first non-IBFD UE 104 and the second non-IBFD UE 106 is depicted for the IBFD communication as shown in the FIG. 1. Further, it is to be understood that a plurality of IBFD nodes (i.e., the IBFD nodes $102_{1-N}$) in communication with a plurality of first non-IBFD UEs (i.e., the first non-IBFD UEs $104_{1-N}$) and a plurality of second non-IBFD UEs (i.e., second non-IBFD UEs $106_{1-N}$) can be depicted for the IBFD communication without departing from the scope of the invention. The IBFD node 102 can be, for example, a Base Station (BS), an eNodeB, a relay node, and an Access Point (AP). The first non-IBFD UE 104 and the second non-IBFD UE 106 can be, for example, a mobile phone, a mobile terminal, a smart phone, Personal Digital Assistants (PDAs), a tablet, and a phablet.

The IBFD node 102 can be configured to transmit a first signal to the first non-IBFD UE 104 over a forward channel. Further, the IBFD node 102 can be configured to receive a second signal from the second non-IBFD UE 106 over the same forward channel simultaneously, where the second signal includes at least one of a pilot signal, CSI, and control information. The forward channel is orthogonal to a reverse channel in at least one of time, frequency, space, and code. In an embodiment, the second signal is received in one of a periodic interval and in the resources determined by the IBFD node 102 based on a plurality of parameters. In an embodiment, the plurality of parameters includes at least one of a channel gain, a channel delay spread, a channel Doppler spread, interference information, and location information of at least one of the first non-IBFD UE 104, the second non-IBFD UE 106, and the IBFD node 102. The periodic interval or the resources are signaled by the IBFD node 102 to the second non-IBFD UE 106. Further, the periodic interval is one of specific and non-specific to the second non-IBFD UE 106, where each of the periodic interval includes a plurality of pilot transmission by the second non-IBFD UE 106. In an embodiment, the pilot signal from the second non-IBFD UE 106 is orthogonal to a pilot signal from the IBFD node 102 in at least one time, frequency, space, and code. The code is one of a CAZAC sequence, a maximal length m-sequence, and a Gold sequence.

Further, the IBFD node 102 can be configured to determine resources in at least one of time, frequency, space, and code for transmitting the second signal from the second non-IBFD UE 106. Further, the IBFD node 102 can be configured to determine a sequence for the pilot signal for transmitting the second signal from the second non-IBFD UE 106. In an embodiment, a resource for the sequence is allocated in one of a contiguous manner and a discontiguous manner in at least one of time and frequency. The sequence is one of common and unique for the second non-IBFD UE 106. In an embodiment, distance between the sequences unique for the second non-IBFD UE 106 is maximized.

Further, the IBFD node 102 can be configured to perform one of broadcast at least one parameter for the sequence to the second non-IBFD UE 106 when the sequence is common to the second non-IBFD UE 106, and unicast at least one parameter for the sequence to the second non-IBFD UE 106 when the sequence is unique to the second non-IBFD UE 106. In an embodiment, the at least one parameter for the sequence is at least one of a cell identifier, a beam identifier, a UE identifier, and a network identifier. In an embodiment, a base sequence of the sequence is orthogonal for each neighboring IBFD node.

Further, the IBFD node 102 can be configured to determine and signal an optimal power to be used by the second non-IBFD UE 106 for transmitting the second signal based on at least one attribute. In an embodiment, the attribute includes at least one of interference information, a location, timing advance, and channel quality information. In an embodiment, the optimal power is spread over at least one of a frequency and time in an Orthogonal Frequency Division Multiplexing (OFDM) symbol. Further, the IBFD node 102 can be configured to receive the second signal on resources of the forward channel, where the resources are orthogonally allocated by the IBFD node 102 in at least one of time, frequency, space, and code to the second non-IBFD UE 106.

Further, the IBFD node 102 can be configured to receive a third signal from a third non-IBFD UE (not shown) over the reverse channel, and transmitting a fourth signal to a fourth non-IBFD UE (not shown) over the reverse channel simultaneously, where the fourth signal includes at least one of a pilot signal, CSI, synchronization information, broadcast information, and control channel information. In an embodiment, the control channel information includes at least one of a HARQ indication, a scheduling grant, modulation and coding index, and power control information. Further, the IBFD node 102 can be configured to calibrate to use reciprocity of the forward channel based on at least one of a known sequence with a low periodicity and the pilot signal. In an embodiment, the known sequence is transmitted by the second non-IBFD UE 106. In an embodiment, the control information includes at least one of a HARQ indication, a scheduling request, a pre-coding matrix indication, a rank indication, interference information, and CQI. In an embodiment, at least one of the first non-IBFD UE 104 and the second non-IBFD UE 106 is selected by the IBFD node 102 based on at least one of Interference information, location information, and channel gain.

The FIG. 1a shows a limited overview of the radio network but, it is to be understood that another embodiment is not limited thereto. Further, the radio network can include different units communicating among each other along with other hardware components or software components on the hardware components.

Figure 2:
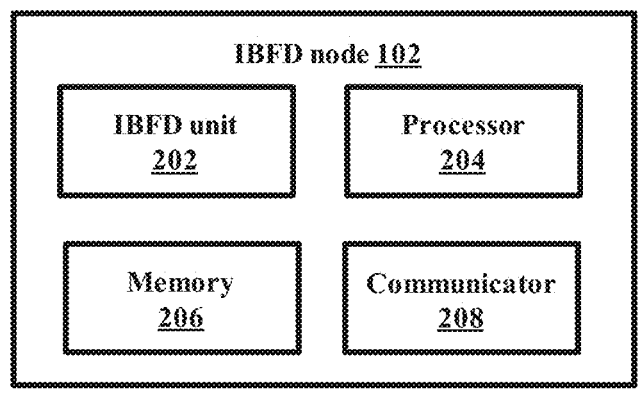
FIG. 2 illustrates various units of an IBFD node, according to an embodiment as disclosed herein.

FIG. 2 illustrates the radio network for allocating a channel to perform Data and Pilot Transmissions, according to an embodiment as disclosed herein. In an embodiment, the radio network 100 includes the IBFD node $102_1$, the IBFD node $102_2$, the first non-IBFD UE $104_1$, the first non-IBFD UE $104_2$, the second non-IBFD UE $106_1$, and the second non-IBFD UE $106_2$. As shown in the FIG. 2, "C1" denotes a channel being used by the IBFD node $102_1$ to send Downlink (DL) pilots to the first non-IBFD UE $104_1$. Further, the same channel "C1" is used by the second non-IBFD UE $106_1$ to transmit Uplink (UL) pilots to the IBFD node $102_1$. In an embodiment, the channel "C1" is a forward channel. In another embodiment, the channel "C1" is a reverse channel.

Further, as shown in the FIG. 2, "C1'" denotes the channel is used by the IBFD node $102_2$ to send the DL pilots to the first non-IBFD UE $104_2$. Further, the same channel "C1'" is used by the IBFD node $102_2$ to receive the UL pilots from the second non-IBFD UE $106_2$. The channels "C1'" and "C2'" can be equal to channels "C1" and "C2".

Further, a cover of orthogonal codes over two sets of the DL data or pilots and the user pilots (i.e., both on the channel "C1") can be applied. Thus, saving partitioning of the time resources or the frequency resources which helps to reduce a self-interference cancellation (SIC) requirement on the channel "C1", as the orthogonal codes provide additional cross-correlation gain. In an embodiment, the orthogonal codes can be the CAZAC sequences, the maximal length m-sequences, the Gold sequences, or combination of the same. Further, the orthogonal codes can be applied over complete IBFD node $102_1$ to the first non-IBFD UE $104_1$ and the first non-IBFD UE $104_1$ to the IBFD node $102_1$ allocations on the channel "C1" or at smaller block levels, such as at a resource block group, resource block, or a collection of resource elements, as defined in 3GPP LTE.

Similarly, the cover of orthogonal codes in the space is useful since it obviates the need for the time resource partitioning or the frequency resource partitioning. The DL data or the pilot signal; and the user pilots on the channel "C1" are multiplied with matrices such that the resultant DL vector lies in a space partially or fully orthogonal to that of the user pilots. Thus, the partial or full orthogonalization helps in reducing the amount of the SIC required by the IBFD node $102_1$ on the channel "C1".

Figure 1B:
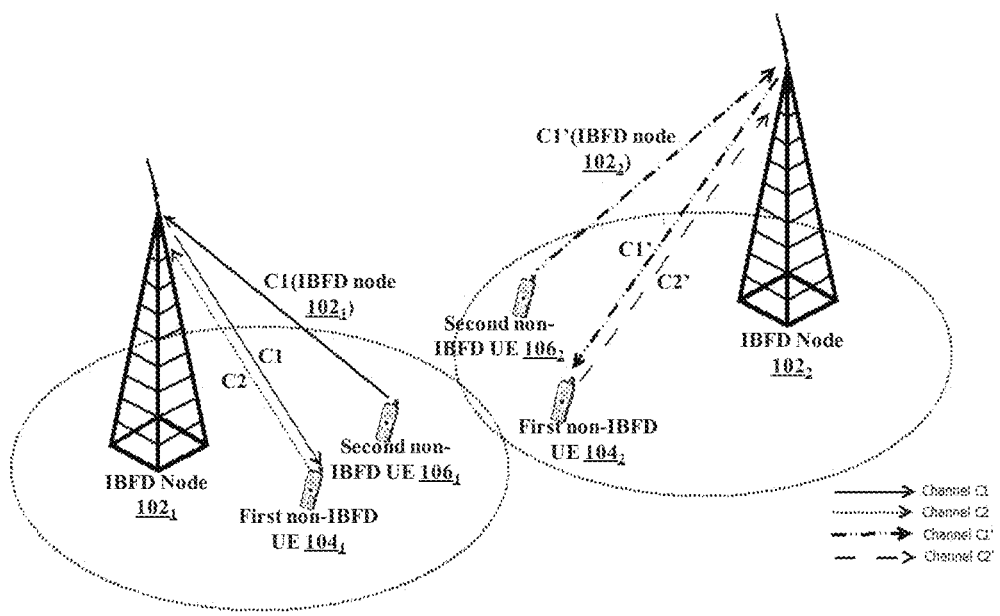
FIG. 1b illustrates a radio network for allocating a channel to perform Data and Pilot Transmissions, according to an embodiment as disclosed herein.

The FIG. 1b shows a limited overview of the radio network but, it is to be understood that another embodiment is not limited thereto. Further, the radio network can include different units communicating among each other along with other hardware components or software components on the hardware components.

Figure 1C:
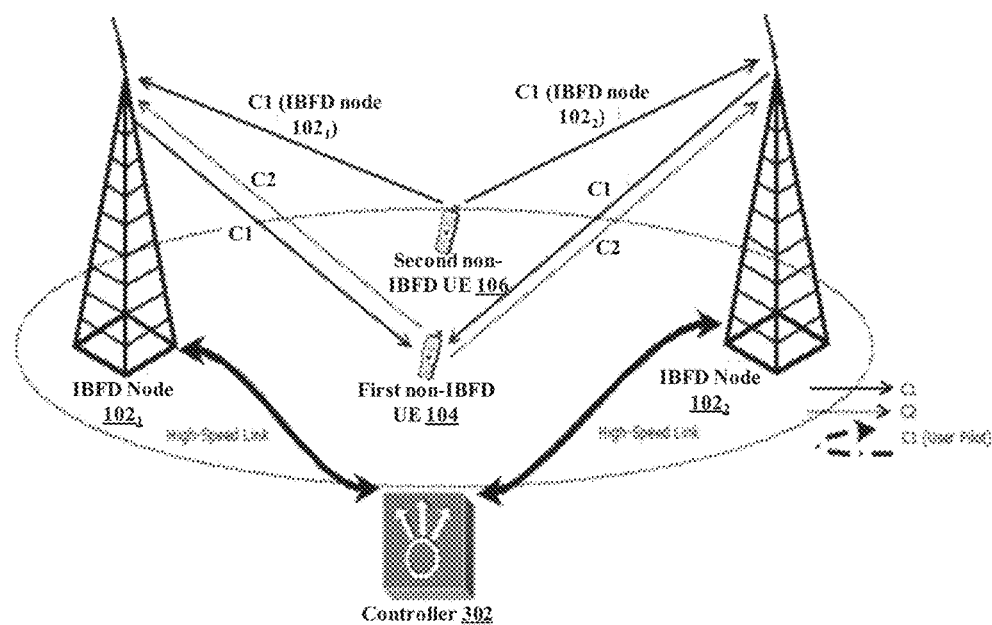
FIG. 1c illustrates a radio network for Coordinated Multi-Point Operation, according to an embodiment as disclosed herein.

FIG. 1c illustrates the radio network for Coordinated Multi-Point Operation, according to an embodiment as disclosed herein. In an embodiment, the radio network includes the IBFD node $102_1$, the IBFD node $102_2$, the first non-IBFD UE 104, the second non-IBFD UE 106, and a controller 302. As shown in the FIG. 1c, "C1" denotes the channel used by the IBFD node $102_1$ to send the DL pilots to the first non-IBFD UE 104. Further, the same channel "C1" is used by the IBFD node $102_1$ to receive the UL pilots from the second non-IBFD UE 106. Further, the channel "C1" is used by the IBFD node $102_2$ to send the DL pilots to the first non-IBFD UE 104. Further, the same "C1" is used by the IBFD node $102_2$ to receive the UL pilots from the second non-IBFD UE 106.

Consider a scenario with the IBFD node $102_1$ and the IBFD node $102_2$ connected to the controller 302 (or scheduler) as shown in the FIG. 1c. In this scenario, the first non-IBFD UE 104 can be configured to receive user pilots from the IBFD node 102 and from the IBFD node $102_2$ over the channel "C1". Further, the second non-IBFD UE 106 can be configured to transmit the user pilots to the IBFD node $102_1$ and to the IBFD node $102_2$ over the channel "C1". The DL channels and the UL channels are divided as shown in the FIG. 1c. The controller 302 can be configured to decide the appropriate resource allocation for the user pilots. Further, the user pilots can be transmitted by the second non-IBFD UE 106, orthogonally, in the training period including $L_j$ ($L_j \geq 1$) cycles, where each cycle includes $K_j$ pilot transmissions by $j^{th}$ non-IBFD UE, where j=1 ... J.

Further, the orthogonality of the user pilot transmissions can be in the time, the frequency, the code, or the spatial domain. The periodicity of the user pilot transmission for the second non-IBFD UE 106 can be decided by the IBFD node $102_1$, considering several factors related to the channel condition of the second non-IBFD UE 106 such as the delay spread, the Doppler shift, and the distance from the IBFD node $102_1$. The training sequence with the low periodicity can be used by the IBFD node $102_1$ or the second non-IBFD UE 106 to calibrate the impairments in channel reciprocity.

This may not be required in case of the second non-IBFD UE 106 transmitting the estimated DL CSI back to the IBFD node 102₁. Further, the user pilots can be transmitted in the spaced out manner similar to sounding signals, where the second non-IBFD UE 106 can be configured to maintain orthogonal user pilot allocation in a spaced out asynchronous manner as and when demanded by the IBFD node 102₁. The user pilot transmission can be power controlled by the IBFD node 102₁ thus, managing the self-interference or other interference.

In existing mechanisms, when the second non-IBFD UE 106 is in a sleep or an idle state, the CSI available at the IBFD node 102₁ can be invalid or outdated once the second non-IBFD UE 106 wakes up. In such scenarios, the IBFD node 102₁ can provide predefined resources for the second non-IBFD UE 106 to transmit the user pilot in such a way that the IBFD node 102₁ receives the DL CSI from the second non-IBFD UE 106 before the second non-IBFD UE 106 is paged on wake-up. Further, the user pilot sequence selection can be performed as described below:

a) The user pilot sequence is a pre-known function of a cell identity of the IBFD node 102₁, or the function broadcasted by the IBFD node 102₁ to the second non-IBFD UE 106. Therefore, neighboring cells have different pilot sequences, though the second non-IBFD UE 106 within a common base station utilizes the same user pilot sequence. This particularly aids the cancellation of the interference created by the user pilot transmitted by the second non-IBFD UE 106 at the DL receiving first non-IBFD UE 104. Since the sequence is known, intelligent mechanism to cancel it at the second non-IBFD UE 106 can be devised.

b) The IBFD node 102₁ assigns the unique user pilot sequences to the second non-IBFD UE 106. These sequences can be derived versions of the same base sequence within the IBFD node 102₁. The base sequence can be orthogonal for neighboring base stations to avoid inter-base station interference. In this case, the DL receiving first non-IBFD UE 104 can decode its data treating interference as a noise.

Since the first non-IBFD UE 104 and the second non-IBFD UE 106 has N antennas, the IBFD node 102₁ can select between SU/MU-MIMO is optimal to the channel conditions. Since the FD radio on the IBFD node 102₁ can cancel finite self-interference only, following bounds on powers for different nodes hold. Consider:

$P_U$=Max. UE Tx. Power
$P_{PL}$=Path loss of UL signal to the IBFD node 102₁
$P_{node}$=Max. node Tx. Power
$P_{S1}$=Max. self-interference cancellation at the IBFD node 102₁
$\sigma^2(B)$=kTFB=Noise power at the IBFD node 102₁ receiver
k=Boltzman's constant (Joules/Kelvin), T=absolute temperature (K), F=noise figure of BS receiver, B=bandwidth of operation (Hz)
$T_{SNR}$=Threshold SNR below which the IBFD node 102₁ fails to decode the UL data, then As the entire channel "C1" is dedicated to the pilot transmission from the second non-IBFD UE 106, power of the user pilots can be spread over the available resources (i.e., the time resources or the frequency resources). For the OFDM system, the user pilot power can spread over frequency (i.e., subcarriers) or various OFDM symbols in time. The user pilots can be allocated in the contiguous or the non-contiguous resources. The optimal power allocation for the pilots can be decided by the IBFD node 102₁ so as to help the SIC at the IBFD node 102₁. For the OFDM system operating on the DL bandwidth=BDL Hz and the UL bandwidth=BUL Hz, this could be mathematically represented as:

$$(P_U - P_{PL}) \text{ dB} - (P_{BS} - P_{SI}) \text{ dB} - (\sigma^2(B)) \text{ dB} \geq (T_{SNR}(B)) \text{ dB}$$

where $B_{DL}=B_{UL}=B$ Hz and for instance if the user pilot is spread across the entire frequency bandwidth, then the effective power-per-subcarrier (PPSC)=$P_U/N_{SC}$, B=$\Delta f \cdot N_{SC}$, $\Delta f$=sub-carrier spacing for the OFDM system, $N_{SC}$=number of sub-carriers in the given bandwidth.

Unlike conventional systems and methods, the coordinated multi-point operation with the IBFD node 102₁ and the IBFD node 102₂ helps in estimating the CSI more accurately and can provide more spectral efficiency of the IBFD enabled radio network. Further, the proposed mechanism is also useful for the MM IBFD enabled radio networks operating on high frequencies. At high frequencies, for instance for millimeter (MM) wave systems, the amount of cross-talk between the Radio Frequency (RF) transmission chains at a circuit level is more. Since the cross-talk is of slowly varying nature, it can be trained with a low frequency and the FD-capability used to cancel the cross-talk, since the data into each of the RF paths is known a-priori.

Unlike conventional systems and methods, the proposed mechanism can be used to transmit the control information such as HARQ indications, scheduling requests, precoding matrix indications, rank indications, or the like from the first non-IBFD UE 104 to the IBFD node 102₁, and reusing the DL channel. The aforementioned control information can be piggybacked on the pilot symbols that are transmitted by the first non-IBFD UE 104 in the DL channel. Alternatively, the control information can be resource orthogonalized to the pilot symbols. Further, the proposed mechanism can be used to aid the UL CSI estimation at the second non-IBFD UE 106. This is achieved by the IBFD node 102₁ transmitting the pilot symbols to second non-IBFD UE 106 in the UL channel or by the IBFD node 102₁ transmitting the estimated UL CSI to the second non-IBFD UE 106 in the UL channel. Since the second non-IBFD UE 106 is not FD-enabled, this is performed by scheduling from the IBFD node 102₁ in the UL channel. This is achievable with minimal interference to the transmitting second non-IBFD UE 106, as the entire UL channel bandwidth is available to the IBFD node 102 and the pilots or the estimated CSI can be transmitted at much lower transmission powers.

Further, the IBFD node 102₁ to transmit synchronization or broadcast information at very low powers in the UL channel. This aids the second non-IBFD UE 106 in achieving DL channel synchronization and broadcast information with reduced latency. This is especially useful for the second non-IBFD UE 106 waking up from sleep mode or going to the connected state from disconnected state. To achieve DL channel synchronization through the UL channel, the second non-IBFD UE 106 needs to apply appropriate calibration as the UL and the DL channels are orthogonal. For instance, for systems such as frequency division duplexed (FDD) networks, where the UL carrier frequency is different from the DL carrier frequency, the second non-IBFD UE 106 needs to be calibrated for appropriate channel propagation delay difference between the UL and DL channels.

The FIG. 1c shows a limited overview of the radio network but, it is to be understood that another embodiment is not limited thereto. Further, the radio network can include different units communicating among each other along with other hardware components or software components on the hardware components.

Figure 1D:
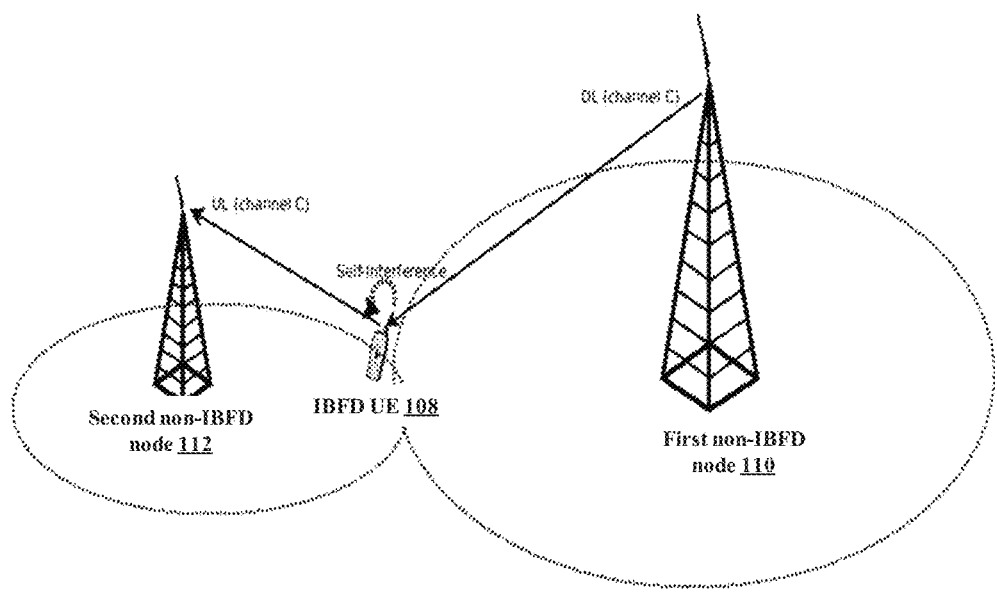
FIG. 1d is another radio network for IBFD communication, according to an embodiment as disclosed herein.

FIG. 1d is another radio network for the IBFD communication, according to an embodiment as disclosed herein. In an embodiment, the radio network includes an IBFD UE 108, a first non-IBFD node 110, and a second non-IBFD node 112. For the sake of convenience and easy explanation, only single first non-IBFD node 110 and the second non-IBFD node 112 is depicted in the FIG. 1d. However, it should be understood that any number of first non-IBFD nodes and any number of second non-IBFD nodes can be depicted performing the proposed mechanism without departing from the scope of the invention. In an embodiment, the first non-IBFD node 110 and the second non-IBFD node 112 can be, for example, the BS, the eNodeB, and the AP. The IBFD UE 108 can be, for example, a mobile phone, a mobile terminal, a smart phone, Personal Digital Assistants (PDAs), a tablet, and a phablet.

As shown in the FIG. 1d, the radio network with the IBFD UE 108 connected to the first non-IBFD node 110 and the second non-IBFD node 112 on the same channel simultaneously is considered. In an embodiment, the first non-IBFD node 110 can be a macro BS and the second non-IBFD node 112 can be a small BS. In another embodiment, the first non-IBFD node 110 can be the small BS and the second non-IBFD node 112 can be the Macro BS. As shown in the FIG. 1d, the first node 110 is the macro BS and the second node 112 is the small BS.

The IBFD UE 108 can be configured to receive a first signal from the first non-IBFD node 110 and send a second signal to the second non-IBFD node 112 over the same channel simultaneously. In an embodiment, the channel can be the forward channel or the reverse channel. Further, the IBFD UE 108 can be configured to mitigate interference generated by the first signal to the second signal using the SIC mechanism. The conventional SIC mechanisms can be used to mitigate the interference generated by the first signal to the second signal.

In heterogeneous network deployments, users are biased to associate with small BSs to offload the traffic from the Master BSs using Cell Range Expansion (CRE). In the CRE area, the user has a better UL channel with the small BS and a better DL channel with the Master BS. The IBFD UE 108 can be configured to simultaneously maintain connection on UL with the second non-IBFD node 112 and on DL with the first non-IBFD node 110 using the same channel. The SIC mechanism, at the IBFD UE 108, enables the IBFD UE 108 to suppress its UL transmission to the second non-IBFD node 112 and simultaneously decode the DL transmission from the first non-IBFD node 110.

Further, the amount of SIC required is dependent on the transmitted power of the IBFD UE 108. Generally, for the IBFD UE 108, the transmit power is limited (for example, 23 dBm for 3GPP LTE). The reduced transmit power in the IBFD UE 108 due to dual connectivity, helps in reducing the requirement of the IBFD UE 108 SIC mechanism as the power separation between the received signal and the self-interference generated by the transmit signal is reduced.

The FIG. 1d shows a limited overview of the radio network but, it is to be understood that another embodiment is not limited thereto. Further, the radio network can include different units communicating among each other along with other hardware or software components.

Figure 1E:
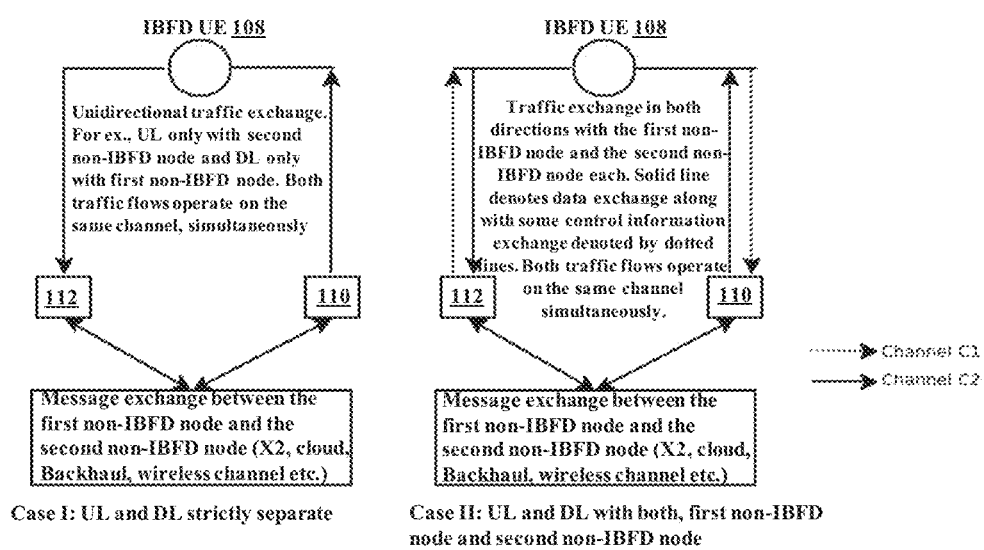
FIG. 1e illustrates UpLink (UL) and DownLink (DL) allocation selections for a Dually Connected Node (DCN), according to an embodiment as disclosed herein.

FIG. 1e illustrates UL and DL allocation selections for a Dually Connected Node (DCN), according to an embodiment as disclosed herein. Here, the DCN is the IBFD UE 108, the Node 2 is the first non-IBFD node 110, and Node 1 is the second non-IBFD node 112.

Case-I:

As shown in the FIG. 1e, the IBFD UE 108 receives DL, only from the first non-IBFD node 110 and transmit UL, only to the second non-IBFD node 112. In this case, the control information to be used by the first non-IBFD node 110 to schedule the data or the control information in the DL to the DCN is provided by the second non-IBFD node 112, through message exchange over Internet Protocol (IP) or dedicated high speed links between the second non-IBFD node 112 and the first non-IBFD node 110. In an embodiment, the control information can be shared over a wireless channel or through a core network. Further, the interference caused by the first non-IBFD node 110 transmission to the IBFD UE 108 can be canceled or mitigated at the second non-IBFD node 112, by the first non-IBFD node 110 explicitly exchanging this information with the second non-IBFD node 112 over the X2, Cloud, Backhaul, wireless channel, or the like. The information can also be overheard by the second non-IBFD node 112 while the first non-IBFD node 110 transmits to the IBFD UE 108 and thus use existing SIC mechanism such as multiple antennas to cancel the interference.

Case-II:

The IBFD UE 108 sends the third signal to the first non-IBFD node 110 and receiving the fourth signal from the second non-IBFD node 112, simultaneously on the forward channel or the reverse channel. As shown in the FIG. 1e, the IBFD UE 108 receives DL data from the first non-IBFD node 110, but partial control information is transferred to the first non-IBFD node 110 in the UL as well. Similarly, the IBFD UE 108 transmits the UL data to the second non-IBFD node 112, but also receives the partial control information in the DL from the second non-IBFD node 112.

Figure 1F:
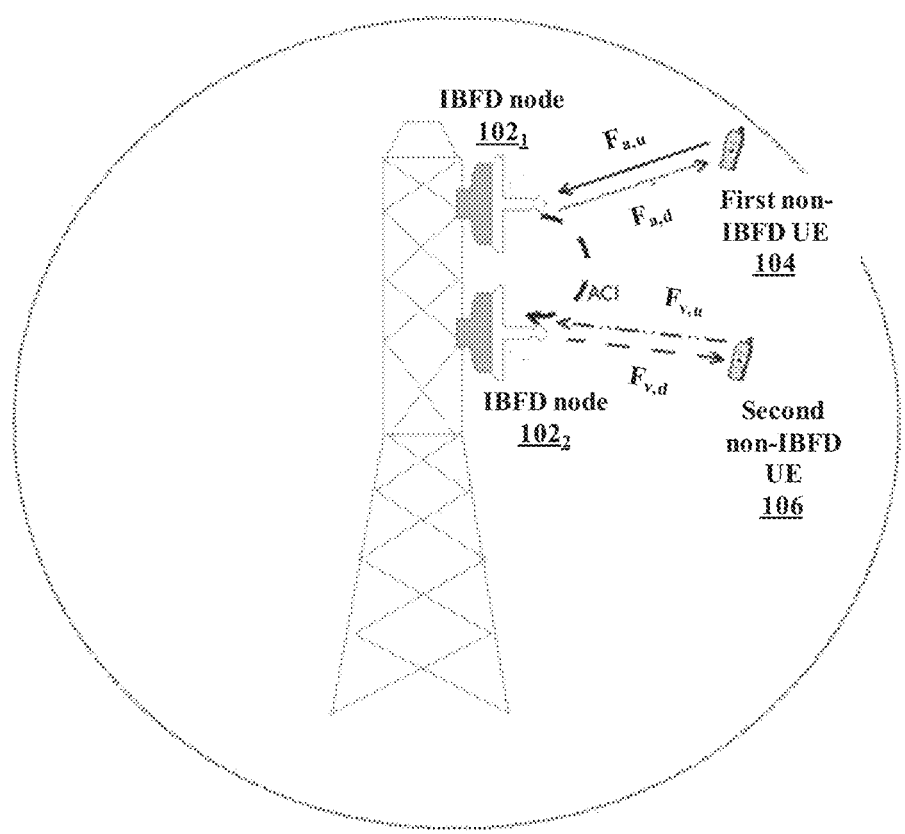
FIG. 1f illustrates a radio network for mitigating Adjacent Channel Interference (ACI), according to an embodiment as disclosed herein.

FIG. 1f illustrates the radio network for mitigating ACI, according to an embodiment as disclosed herein. In an embodiment, the IBFD enabled radio network includes the IBFD node $102_1$, the IBFD node $102_2$, the first non-IBFD UE 104, and the second non-IBFD UE 106. A transmitting station, which is generating the ACI, is IBFD node $102_1$. A receiving station to which the ACI is caused is the IBFD node $102_2$. In an embodiment, the IBFD node $102_1$ and the IBFD node $102_2$ are IFBD enabled radios.

As show in the FIG. 1f, the radio network includes the IBFD node $102_1$ operating on carrier frequencies $F_{a,d}$ and $F_{a,u}$ as DL and UL frequencies. Similarly, the IBFD node $102_2$ operating on carrier frequencies $F_{v,d}$ and $F_{v,u}$ as DL and UL frequencies. As the IBFD node $102_1$ and the IBFD node $102_2$ are operating in the IBFD mode, the $F_{a,d}$ is equal to the $F_{a,u}$ (i.e., $F_{a,d}=F_{a,u}$) and the $F_{v,d}$ is equal to the $F_{v,u}$ (i.e., $F_{v,d}=F_{v,u}$). If the $F_{a,d}$ and the $F_{v,u}$ are close enough, then the IBFD node $102_1$ is a potential ACI generator for the IBFD node $102_2$. In case of high bandwidth OFDM systems, the ACI is more prominent at high transmit powers. For instance, with respect to the ACI requirements imposed by 3GPP LTE TS 36.104, the IBFD node $102_2$ can be receiving a 5 MHz signal centered on a carrier which is 5 MHz away from the carrier in which the IBFD node $102_1$ operates, at a bandwidth of the 5 MHz. The integrated interference power at which the IBFD node $102_2$ can be in the order of −40 dBm and for the IBFD node $102_1$ at 15 dBm. When compared with typical receive powers for the IBFD node $102_2$, on the order of −60 to −80 dBm, the ACI power saturates the IBFD node $102_2$ or reduces the received SINR considerably, thus rendering the received signal un-decodable.

Further, the IBFD node $102_1$ while transmitting a signal $S_{a,d}$ in the DL to the first non-IBFD UE 104, can transmit the same signal through a wireless or wired path towards the IBFD node $102_2$. In an embodiment, the wireless path can be dedicated beamforming towards the IBFD node $102_2$. Further, the dedicated beamforming can be transmit or receive beamforming. In case of the receive beamforming, the IBFD node $102_2$ can overhear the ACI generated by the IBFD node $102_1$. Since the IBFD node $102_2$ is aware of the ACI it is going to receive in the UL signal, it uses the a-priori information about $S_{a,d}$ to pre-subtract the same from the received signal using its FD capability, before applying the decoding process. The IBFD operation is achieved using the SIC since the interference is known at the IBFD node $102_2$, a-priori. In an embodiment, using Taylor series expansion, the self-interference, i.e., the delayed version of the transmitted signal can be linearized into a scaled sum of the transmitted signal and its various order differentials. This can be used as a copy to match the self-interference and mitigate the effect of the ACI. In an embodiment, there can be wired or wireless methods to gather information of the ACI at the IBFD node $102_2$ as described below:

The IBFD node $102_1$ while transmitting the signal to the first non-IBFD UE 104, the wireless methods can be accomplished using at least one of the following as described below:

a. The IBFD node $102_1$ can use additional antenna element(s) to direct the signal towards the IBFD node $102_2$, using the transmit beamforming.

b. The IBFD node $102_2$ can use additional antenna element(s) to receiver or overhear the signal which is causing the ACI from the IBFD node $102_1$ using the receive beamforming.

Further, the wired methods can be achieved using at least one of the following as described below:

a. The wired interface between BSs in cellular networks (X2 in 3GPP E-UTRA); and b. Dedicated radio frequency cables deployed from the IBFD node $102_1$ to the IBFD node $102_2$.

Unlike conventional systems and methods, the prior information of the ACI received by the IBFD node $102_2$ converts the problem into SIC problem. For example, the SIC can be achieved by the IBFD node $102_2$ using any combination of analog plus digital cancellation. The ACI suppression capability is useful for many scenarios as described below:

a. Nodes operating in the IBFD mode on adjacent frequencies, causing interference to each other. In an example, the IBFD node $102_1$ is causing interference to the IBFD node $102_2$.

b. Multi-RAT coexistence where the BS can be transmitting or receiving over multiple adjacent channels and one RAT causing ACI to another RAT.

c. WLAN-LTE coexistence where the LTE and a WLAN operate on adjacent bands d. Multiple operators deploying BSs that share the same tower and use adjacent channels to transmit or receive.

e. Dynamic Time Duplex Division (TDD) operation amongst same or different operators.

f. A TDD band operating in between two consecutive FDD band results in ACI being generated from the TDD to the FDD and vice-versa.

As shown in the FIG. 1f, the DL transmission performed by the IBFD node $102_1$ leaks into the receive band of the IBFD node $102_2$, causing the ACI and degrading the receive SINR of the IBFD node $102_2$. Further, the IBFD node $102_1$ can transmit a copy of its DL signal to the IBFD node $102_2$ over a directed link. Thus, helping the IBFD node $102_2$ to know the interference a-priori and use its IBFD capability to cancel the interference from the received signal.

Unlike conventional systems and methods, the proposed mechanism provides the IBFD node $102_2$ with the prior knowledge of the interfering signal. The system effectively converts the ACI to the self-interference. The SIC is performed based on the Taylor series approximation of the self-interference.

The FIG. 1f shows a limited overview of the radio network but, it is to be understood that another embodiment is not limited thereto. Further, the radio network can include different units communicating among each other along with other hardware or software components.

FIG. 2 illustrates various units of the IBFD node 102, according to an embodiment as disclosed herein. In an embodiment, the IBFD node 102 includes an IBFD unit 202, a processor 204, a memory 206, and a communicator 208. The IBFD unit 202 can be configured to transmit and receive simultaneously in the same frequency band.

The processor 204 can be configured to transmit the first signal to the first non-IBFD UE 104 over the forward channel. Further, the processor 204 can be configured to receive the second signal from the second non-IBFD UE 106 over the same forward channel simultaneously, where the second signal includes the pilot signal, the CSI, the control information, or combination of same. In an embodiment, the forward channel is orthogonal to the reverse channel in the time, the frequency, the space, the code, or combination of same.

Further, the processor 204 can be configured to receive the third signal from the third non-IBFD UE over the reverse channel. Further, the processor 204 can be configured to determine the resources in the time, the frequency, the space, the code, or combination of same for transmitting the second signal by the non-IBFD UE 104. Further, the processor 204 can be configured to transmit the fourth signal to the fourth non-IBFD UE over the reverse channel while receiving the fifth signal from another non-IBFD UE on the reverse channel simultaneously. The fourth signal includes the pilot signal, the CSI, the control information, or combination of same.

Further, the processor 204 can be configured to determine the sequence for the pilot signal for transmitting the second signal from the second non-IBFD UE 106. Further, the processor 204 can be configured to determine and signal the optimal power to be used by the second non-IBFD UE 106 for transmitting the second signal based on the at least one attribute. Further, the processor 204 can be configured to receive the second signal on resources of the forward channel, where the resources are orthogonal in the time, the frequency, the space, the code, or combination of same with respect to the second non-IBFD UE 106.

The memory 206 may include one or more computer-readable storage media. The memory 206 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 206 may, in some examples, be considered a non-transitory storage medium. The term "non-transitory" may indicate that the storage medium is not embodied in a carrier wave or a propagated signal. However, the term "non-transitory" should not be interpreted that the memory 206 is non-movable. In some examples, the memory 206 can be configured to store larger amounts of information than the memory. In certain examples, a non-transitory storage medium may store data that can, over time, change (e.g., in Random Access Memory (RAM) or cache). The communicator 208 communicates internally with the units and externally with networks. Further, the functionalities of the processor can also be performed by the IBFD unit 202 without departing from the scope of the invention.

The FIG. 2 shows a limited overview of the IBFD node 102 but, it is to be understood that another embodiment is not limited thereto. Further, the IBFD node 102 can include different units communicating among each other along with other hardware or software components. By way of illustration, both an application running on the IBFD node 102 and the IBFD node 102 can be the component.

Figure 3:
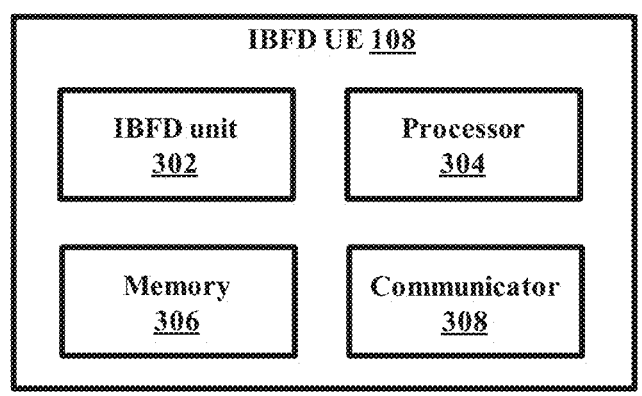
FIG. 3 illustrates various units of an IBFD UE, according to an embodiment as disclosed herein.

FIG. 3 illustrates various units of the IBFD UE 108, according to an embodiment as disclosed herein. In an embodiment, the IBFD UE 108 includes an IBFD unit 302, a processor 304, a memory 306, and a communicator 308. The IBFD unit 302 can be configured to transmit and receive simultaneously in the same frequency band.

The processor 304 can be configured to receive the first signal from the first non-IBFD node 110 and sending the second signal to the second non-IBFD node 112 simultaneously on the forward channel or the reverse channel. Further, the processor 304 can be configured to mitigate the interference (i.e., ACI) generated by the second signal to the first signal using the SIC mechanism. Further, the processor 304 can be configured to send the third signal to the first non-IBFD node 110 and receiving the fourth signal from the second non-IBFD node 112 simultaneously on the forward channel or the reverse channel.

The memory 306 may include one or more computer-readable storage media. The memory 306 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 306 may, in some examples, be considered a non-transitory storage medium. The term "non-transitory" may indicate that the storage medium is not embodied in a carrier wave or a propagated signal. However, the term "non-transitory" should not be interpreted that the memory 306 is non-movable. In some examples, the memory 306 can be configured to store larger amounts of information than the memory. In certain examples, a non-transitory storage medium may store data that can, over time, change (e.g., in Random Access Memory (RAM) or cache). The communicator 308 communicates internally with the units and externally with networks. Further, the functionalities of the processor 304 can also be performed by the IBFD unit 302 without departing from the scope of the invention.

The FIG. 3 shows a limited overview of the IBFD UE 108 but, it is to be understood that another embodiment is not limited thereto. Further, the IBFD UE 108 can include different units communicating among each other along with other hardware or software components. By way of illustration, both an application running on the IBFD UE 108 and the IBFD UE 108 can be the component.

Figure 4:
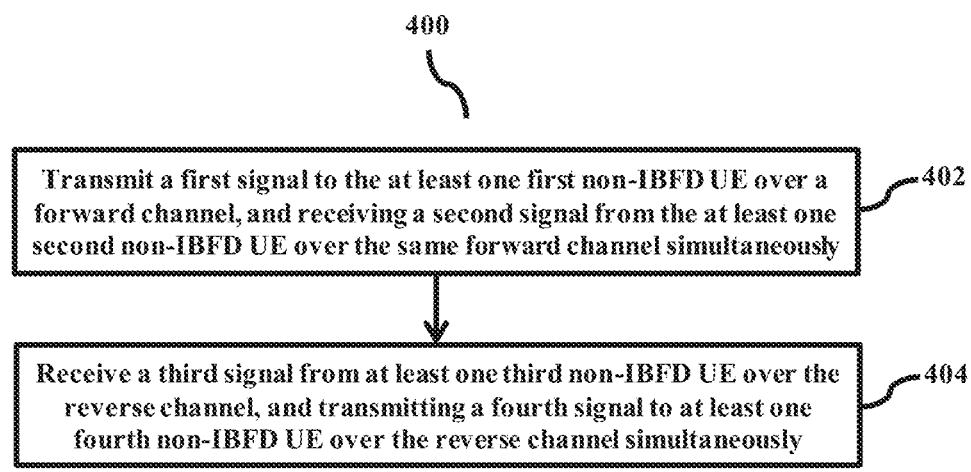
FIG. 4 is a flow diagram illustrating a method for IBFD communication in a radio network, according to an embodiment as disclosed herein.

FIG. 4 is a flow diagram 400 illustrating a method for the IBFD communication in the radio network, according to an embodiment as disclosed herein.

At step 402, the method includes transmitting the first signal to the first non-IBFD UE 104 over the forward channel, and receiving the second signal from the second non-IBFD UE 106 over the same forward channel simultaneously. The method allows the IBFD node 102 to transmit the first signal to the first non-IBFD UE 104 over the forward channel, and receive the second signal from the second non-IBFD UE 106 over the same forward channel simultaneously. The second signal includes at least one of the pilot signal, the CSI, and the control information. The forward channel is orthogonal to the reverse channel in at least one of the time, the frequency, the space, and the code. In an embodiment, the second signal is received in one of the periodic interval and in the resources determined by the IBFD node 102 based on the plurality of parameters. In an embodiment, one of the periodic interval and the resources are signaled by the IBFD node 102 to the second non-IBFD UE 106.

In an embodiment, the IBFD node 102 can be configured to determine the resources in at least one of the time, the frequency, the space, and the code for transmitting the second signal from the second non-IBFD UE 106. In an embodiment, the periodic interval is one of the specific and the non-specific to the second non-IBFD UE 106, where each of the periodic interval includes the plurality of pilot transmissions by the second non-IBFD UE 106.

In an embodiment, the plurality of parameters includes at least one of the channel gain, the channel delay spread, the channel Doppler spread, the interference information and the location information of at least one of the first non-IBFD UE 104, the second non-IBFD UE 106, and the IBFD node 102. In an embodiment, the IBFD node 102 determines the sequence for the pilot signal for transmitting the second signal from the second non-IBFD UE 106.

In an embodiment, the resource for the sequence is allocated in one of the contiguous manner and the discontiguous manner in at least one of the time and the frequency. The sequence is one of the common and the unique for each of the second non-IBFD UE 106. In an embodiment, the distance between the sequences unique for each of the second non-IBFD UE 106 is maximized.

In an embodiment, the IBFD node 102 performs one of broadcast the at least one parameter for the sequence to the second non-IBFD UE 106 when the sequence is common to the second non-IBFD UE 106, and unicast the at least one parameter for the sequence to the second non-IBFD UE 106 when the sequence is unique to the second non-IBFD UE 106.

In an embodiment, the at least one parameter for the sequence is at least one of the cell identifier, the beam identifier, the UE identifier, and the network identifier. In an embodiment, the base sequence of the sequence is orthogonal for each neighboring IBFD node. In an embodiment, the IBFD node 102 determines and signals the optimal power to be used by the second non-IBFD UE 106 for transmitting the second signal based on the at least one attribute. The attribute includes at least one of the interference information, the location, the timing advance, and the channel quality information. The optimal power is spread over at least one of the frequency and the time in the OFDM symbol.

In an embodiment, the IBFD node 102 receives the second signal on the resources of the forward channel, where the resources are orthogonally allocated by the IBFD node 102 in at least one of the time, the frequency, the space, and the code to the second non-IBFD UE 106. In an embodiment, the pilot signal from the second non-IBFD UE 106 is orthogonal to the pilot signal from the IBFD node 102 in at least one of the time, the frequency, the space, and the code. The code is one of the CAZAC sequence, the maximal length m-sequence, and the Gold sequence.

At step 404, the method includes receiving the third signal from the third non-IBFD UE over the reverse channel, and transmitting the fourth signal to the fourth non-IBFD UE over the reverse channel simultaneously. The method allows the IBFD node 102 to receive the third signal from the third non-IBFD UE over the reverse channel, and transmitting the fourth signal to the fourth non-IBFD UE over the reverse channel simultaneously. The fourth signal includes at least one of the pilot signal, the CSI, the synchronization information, the broadcast information, and the control channel information.

In an embodiment, the control channel information includes at least one of the HARQ indication, the scheduling grant, the modulation and the coding index, and the power control information. In an embodiment, the IBFD node 102 calibrates to use reciprocity of the forward channel based on at least one of the known sequence with the low periodicity and the pilot signal. The known sequence is transmitted by the second non-IBFD UE 106.

In an embodiment, the control information includes at least one of the HARQ indication, the scheduling request, the pre-coding matrix indication, the rank indication, the interference information, and the CQI. In an embodiment, at least one of the first non-IBFD UE 104 and the second non-IBFD UE 106 is selected by the IBFD node 102 based on at least one of the Interference information, the location information, and the channel gain.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
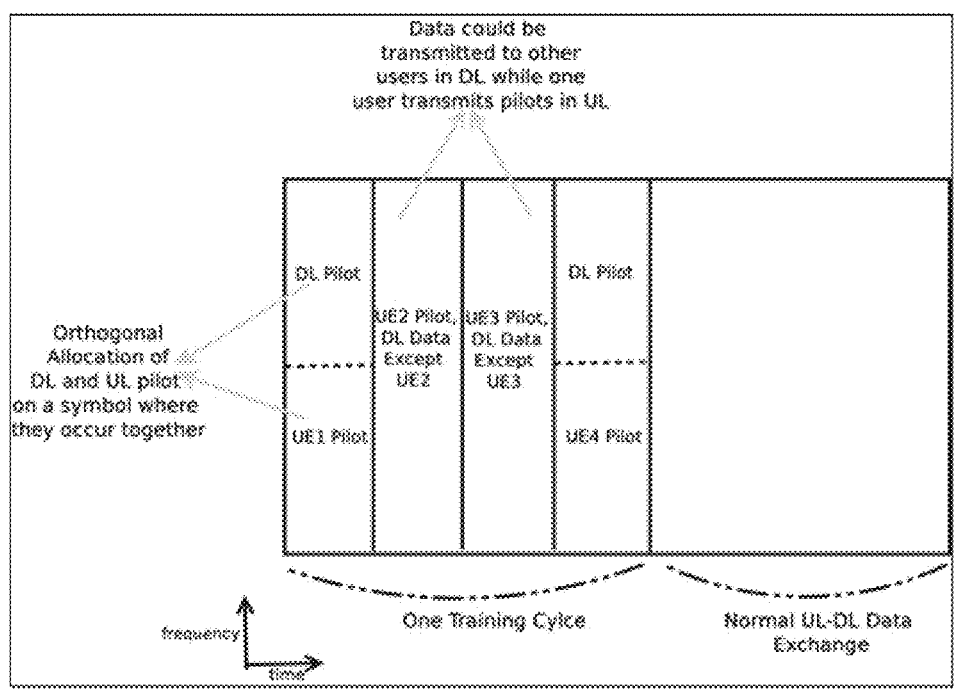
FIG. 5 illustrates an example resource grid for Traffic Exchange between an IBFD node and a non-IBFD UE in a 4-UE OFDM system, according to an embodiment as disclosed herein.

FIG. 5 illustrates an example resource grid for Traffic Exchange between the IBFD node 102 and the non-IBFD UE in a 4-UE OFDM system, according to an embodiment as disclosed herein.

As shown in the FIG. 5, thin dotted line denotes the orthogonalization in frequency resources between the pilot signals of the UE and the downlink pilot signals. Further, the orthogonalization is achieved in the time, the code, the space, or the like. Each of the non-IBFD UE pilot signal is orthogonal to the downlink pilot signal of the IBFD node 102. Further, the non-IBFD UE transmitting the user pilots are not scheduled any downlink data. Quite similarly, the non-IBFD UE sends the estimated DL CSI to the IBFD node 102 instead of sending the user pilots. Whether to transmit the user pilots for DL CSI estimation at the IBFD node 102 or transmit the estimated DL CSI itself, is a system design constraint.

Figure 6:
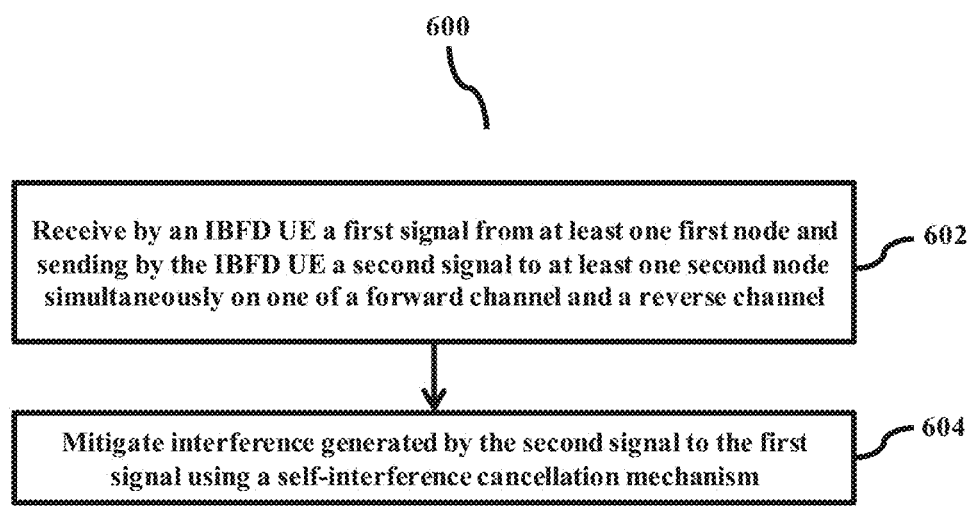
FIG. 6 is another flow diagram illustrating a method for IBFD communication in a radio network, according to an embodiment as disclosed herein.

FIG. 6 is a flow diagram 600 illustrating a method for IBFD communication in the radio network, according to an embodiment as disclosed herein.

At step 602, the method includes receiving the first signal from the first non-IBFD node 110 and sending the second signal to the second non-IBFD node 112 simultaneously on the forward channel or the reverse channel. The method allows the IBFD UE 108 to receive the first signal from the first non-IBFD node 110 and sending the second signal to the second non-IBFD node 112 simultaneously on the forward channel or the reverse channel.

At step 604, the method includes mitigating the interference generated by the second signal to the first signal using the SIC mechanism. The method allows the IBFD UE 108 to mitigate the interference generated by the second signal to the first signal using the SIC mechanism.

The various actions, acts, blocks, steps, or the like in the flow diagram 600 may be performed in the order presented, in a different order or simultaneously. Further, in some embodiments, some of the actions, acts, blocks, steps, or the like may be omitted, added, modified, skipped, or the like without departing from the scope of the invention.

Figure 7:
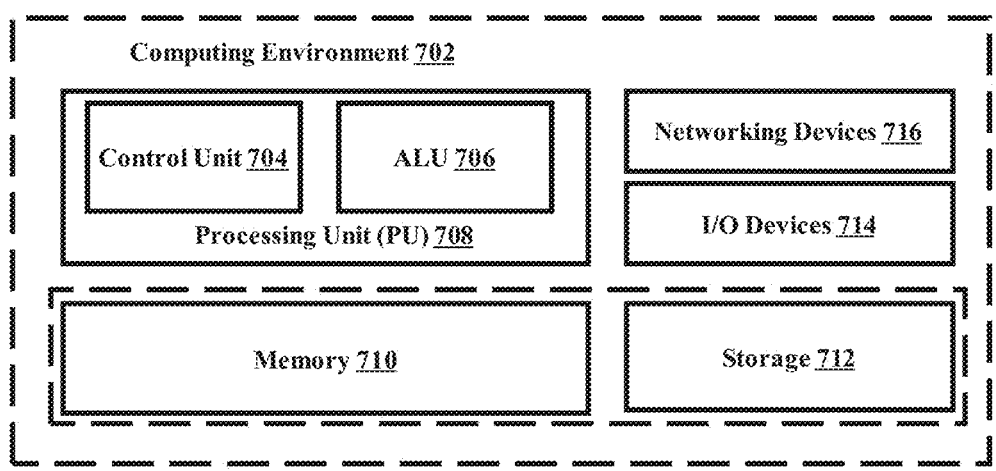
FIG. 7 illustrates a computing environment implementing the method for IBFD communication in a radio network, according to embodiments as disclosed herein.

FIG. 7 illustrates a computing environment implementing the method for the IBFD communication in the radio network, according to embodiments as disclosed herein. As depicted in the figure, the computing environment 702 comprises at least one processing unit 708 that is equipped with a control unit 704 and an Arithmetic Logic Unit (ALU) 706, a memory 710, a storage unit 712, plurality of networking devices 716 and a plurality Input output (I/O) devices 714. The processing unit 708 is responsible for processing the instructions of the technique. The processing unit 708 receives commands from the control unit in order to perform its processing. Further, any logical and arithmetic operations involved in the execution of the instructions are computed with the help of the ALU 706.

The overall computing environment 702 can be composed of multiple homogeneous and/or heterogeneous cores, multiple CPUs of different kinds, special media and other accelerators. The processing unit 708 is responsible for processing the instructions of the technique. Further, the plurality of processing units 1208 may be located on a single chip or over multiple chips.

The technique comprising of instructions and codes required for the implementation are stored in either the memory unit 710 or the storage 712 or both. At the time of execution, the instructions may be fetched from the corresponding memory 710 or storage 712, and executed by the processing unit 708.

In case of any hardware implementations various networking devices 716 or external I/O devices 714 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 7 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for In Band Full Duplex (IBFD) communication in a radio network comprising at least one IBFD node, at least one first non-IBFD User Equipment (UE), and at least one second non-IBFD UE, the method comprising:

transmitting by the at least one IBFD node a first signal to the at least one first non-IBFD UE over a forward channel, and receiving by the at least one IBFD node a second signal from the at least one second non-IBFD UE over the same forward channel simultaneously, wherein the second signal comprising at least one of a pilot signal, Channel State Information (CSI), and control information, wherein the forward channel is orthogonal to a reverse channel in at least one of time, frequency, space, and code.

2. The method of claim 1, wherein the at least one IBFD node determines resources in at least one of time, frequency, space, and code for transmitting the second signal from the at least one second non-IBFD UE.

3. The method of claim 2, wherein the second signal is received in one of a periodic interval and in the resources determined by the at least one IBFD node based on a plurality of parameters.

4. The method of claim 3, wherein one of the periodic interval and the resources are signaled by the at least one IBFD node to the at least one second non-IBFD UE.

5. The method of claim 3, wherein the periodic interval is one of specific and non-specific to the at least one second non-IBFD UE, wherein each of the periodic interval comprises a plurality of pilot transmissions by the at least one second non-IBFD UE.

6. The method of claim 3, wherein the plurality of parameters comprises at least one of a channel gain, a channel delay spread, a channel Doppler spread, interference information and location information of at least one of the first non-IBFD UE, the second non-IBFD UE and the at least one IBFD node.

7. The method of claim 1, wherein the at least one IBFD node determines a sequence for the pilot signal for transmitting the second signal from the at least one second non-IBFD UE.

8. The method of claim 7, wherein a resource for the sequence is allocated in one of a contiguous manner and a discontiguous manner in at least one of time and frequency.

9. The method of claim 7, wherein the sequence is one of common and unique for each of the at least one second non-IBFD UE.

10. The method of claim 9, wherein distance between the sequences unique for each of the at least one second non-IBFD UE is maximized.

11. The method of claim 9, wherein the at least one IBFD node performs one of broadcast at least one parameter for the sequence to each of the second non-IBFD UEs when the sequence is common to each of the second non-IBFD UEs, and unicast at least one parameter for the sequence to each of the second non-IBFD UEs when the sequence is unique to each of the second non-IBFD UEs.

12. The method of claim 11, wherein the at least one parameter for the sequence is at least one of a cell identifier, a beam identifier, a UE identifier, and a network identifier.

13. The method of claim 7, wherein a base sequence of the sequence is orthogonal for each neighboring IBFD node.

14. The method of claim 1, wherein the at least one IBFD node determines and signals an optimal power to be used by the at least one second non-IBFD UE for transmitting the second signal based on at least one attribute.

15. The method of claim 14, wherein the attribute comprises at least one of interference information, a location, timing advance and channel quality information.

16. The method of claim 14, wherein the optimal power is spread over at least one of a frequency and time in an Orthogonal Frequency Division Multiplexing (OFDM) symbol.

17. The method of claim 1, wherein the at least one IBFD node receives the second signal on resources of the forward channel, wherein the resources are orthogonally allocated by the at least one IBFD node in at least one of time, frequency, space, and code to the at least one second non-IBFD UE.

18. The method of claim 1, wherein the pilot signal from the at least one second non-IBFD UE is orthogonal to a pilot signal from the IBFD node in at least one time, frequency, space, and code.

19. The method of claim 18, wherein the code is one of a Constant Amplitude Zero Auto-Correlation (CAZAC) sequence, a maximal length m-sequence, and a Gold sequence.

20. The method of claim 1, wherein the method further comprising:
receiving, by the at least one IBFD node, a third signal from at least one third non-IBFD UE over the reverse channel, and transmitting by the at least one IBFD node a fourth signal to at least one fourth non-IBFD UE over the reverse channel simultaneously, wherein the fourth signal comprising at least one of a pilot signal, CSI, synchronization information, broadcast information, and control channel information.

21. The method of claim 20, wherein the control channel information comprises at least one of a Hybrid Automatic Repeat Request (HARQ) indication, a scheduling grant, modulation and coding index, and a power control information.

22. The method of claim 1, wherein the at least one IBFD node calibrates to use reciprocity of the forward channel based on at least one of a known sequence with a low periodicity and the pilot signal.

23. The method of claim 22, wherein the known sequence is transmitted by the second non-IBFD UE.

24. The method of claim 1, wherein the control information comprises at least one of a Hybrid Automatic Repeat Request (HARQ) indication, a scheduling request, a precoding matrix indication, a rank indication, interference information and Channel Quality Indicator (CQI).

25. The method of claim 1, wherein at least one of the at least one first non-IBFD UE and the at least one second non-IBFD UE is selected by the at least one IBFD node based on at least one of Interference information, location information, and channel gain.

26. An In Band Full Duplex (IBFD) node for IBFD communication in a radio network comprising at least one first non-IBFD User Equipment (UE) and at least one second non-IBFD UE, the IBFD node comprising:
a memory;
a processor, coupled to the memory, configured to:
transmit a first signal to the at least one first non-IBFD UE over a forward channel, and receive a second signal from the at least one second non-IBFD UE over the same forward channel simultaneously, wherein the second signal comprising at least one of a pilot signal, Channel State Information (CSI), and control information, wherein the forward channel is orthogonal to a reverse channel in at least one of time, frequency, space, and code.

27. The IBFD node of claim 26, wherein the at least one IBFD node determines resources in at least one of time, frequency, space, and code for transmitting the second signal from the at least one second non-IBFD UE.

28. The IBFD node of claim 27, wherein the second signal is received in one of a periodic interval and in the resources determined by the at least one IBFD node based on a plurality of parameters.

29. The IBFD node of claim 28, wherein one of the periodic interval and the resources are signaled by the at least one IBFD node to the at least one second non-IBFD UE.

30. The IBFD node of claim 28, wherein the periodic interval is one of specific and non-specific to the at least one second non-IBFD UE, wherein each of the periodic interval comprises a plurality of pilot transmissions by the at least one second non-IBFD UE.

31. The IBFD node of claim 28, the plurality of parameters comprises at least one of a channel gain, a channel delay spread, a channel Doppler spread, interference information, and location information of at least one of the first non-IBFD UE, the second non-IBFD UE, and the at least one IBFD node.

32. The IBFD node of claim 26, wherein the at least one IBFD node determines a sequence for the pilot signal for transmitting the second signal from the at least one second non-IBFD UE.

33. The IBFD node of claim 32, wherein a resource for the sequence is allocated in one of a contiguous manner and a discontiguous manner in at least one of time and frequency.

34. The IBFD node of claim 32, wherein the sequence is one of common and unique for each of the at least one second non-IBFD UE.

35. The IBFD node of claim 34, wherein distance between the sequences unique for each of the at least one second non-IBFD UE is maximized.

36. The IBFD node of claim 34, wherein the at least one IBFD node perform one of broadcast at least one parameter for the sequence to each of the second non-IBFD UEs when the sequence is common to each of the second non-IBFD UEs, and unicast at least one parameter for the sequence to each of the second non-IBFD UEs when the sequence is unique to each of the second non-IBFD UEs.

37. The IBFD node of claim 36, wherein the at least one parameter for the sequence is at least one of a cell identifier, a beam identifier, a UE identifier, and a network identifier.

38. The IBFD node of claim 32, wherein a base sequence of the sequence is orthogonal for each neighboring IBFD node.

39. The IBFD node of claim 26, wherein the at least one IBFD node determines and signals an optimal power to be used by the at least one second non-IBFD UE for transmitting the second signal based on at least one attribute.

40. The IBFD node of claim 39, wherein the attribute comprises interference information, a location, timing advance, and channel quality information.

41. The IBFD node of claim 39, wherein the optimal power is spread over at least one of a frequency and time in an Orthogonal Frequency Division Multiplexing (OFDM) symbol.

42. The IBFD node of claim 26, wherein the at least one IBFD node receives the second signal on resources of the forward channel, wherein the resources are orthogonal allocated by the at least one IBFD node in at least one of time, frequency, space, and code to the at least one second non-IBFD UE.

43. The IBFD node of claim 26, wherein the pilot signal from the at least one second non-IBFD UE is orthogonal to a pilot signal from the IBFD node in at least one time, frequency, space, and code.

44. The IBFD node of claim 43, wherein the code is one of a Constant Amplitude Zero Auto-Correlation (CAZAC) sequence, a maximal length m-sequence, and a Gold sequence.

45. The IBFD node of claim 26, wherein the processor is further configured to:
receive a third signal from the at least one third non-IBFD UE over the reverse channel, and transmit a fourth signal to at least one fourth non-IBFD UE over the reverse channel simultaneously, wherein the fourth signal comprising at least one of a pilot signal, CSI, synchronization information, broadcast information, and control channel information.

46. The IBFD node of claim 45, wherein the control information comprises at least one of a Hybrid Automatic Repeat Request (HARQ) indication, a scheduling grant, modulation and coding index, and a power control information.

47. The IBFD node of claim 26, wherein the at least one IBFD node calibrates to use reciprocity of the forward channel based on at least one of a known sequence with a low periodicity and the pilot signal.

48. The IBFD node of claim 47, wherein the known sequence is transmitted by the second non-IBFD UE.

49. The IBFD node of claim 26, wherein the control information comprises at least one of a Hybrid Automatic Repeat Request (HARQ) indication, a scheduling request, a pre-coding matrix indication, a rank indication, and Channel Quality Indicator (CQI).

50. The IBFD node of claim 26, wherein at least one of the at least one first non-IBFD UE and the at least one second non-IBFD UE is selected by the at least one IBFD node based on at least one of Interference information, location information, and channel gain.

51. A system for In Band Full Duplex (IBFD) communication, the system comprising:
at least one first non-IBFD User Equipment (UE);
at least one second non-IBFD UE; and
at least one IBFD node, configured to:
transmit a first signal to the at least one first non-IBFD UE over a forward channel, and receive a second signal from at least one second non-IBFD UE over the same forward channel simultaneously, wherein the second signal comprising at least one of a pilot signal, Channel State Information (CSI) and control information, wherein the forward channel is orthogonal to a reverse channel in at least one of time, frequency, space, and code.

52. The system of claim 51, wherein the at least one IBFD node is further configured to:
receive a third signal from the at least one third non-IBFD UE over the reverse channel, and transmit a fourth signal to the at least one fourth non-IBFD UE over the reverse channel simultaneously, wherein the fourth signal comprising at least one of a pilot signal, CSI, synchronization information, broadcast information, and control channel information.

53. A system for In Band Full Duplex (IBFD) communication, the system comprising:
at least one first non-IBFD node;
at least one second non-IBFD node; and
an IBFD User Equipment (UE), connected to the first non-IBFD node and the second non-IBFD node, configured to:
receive a first signal from the at least one first non-IBFD node and send a second signal to the at least one second non-IBFD node simultaneously on one of a forward channel and a reverse channel.

54. The system of claim 53, wherein the IBFD UE is further configured to send a third signal to the at least one first non-IBFD node and receive a fourth signal from the at least one second non-IBFD node simultaneously on one of the forward channel and the reverse channel.

55. The system of claim 53, wherein the IBFD UE is further configured to mitigate an interference generated by the second signal to the first signal using a self-interference cancellation mechanism.

* * * * *